3,462,853
EDUCATIONAL DEVICE
Heinz Kunert, Agidienberger Strasse 16,
Cologne 5, Germany
Filed July 20, 1967, Ser. No. 655,725
Claims priority, application Germany, July 19, 1966,
K 59,815
Int. Cl. G09b 3/06
U.S. Cl. 35—9                             24 Claims

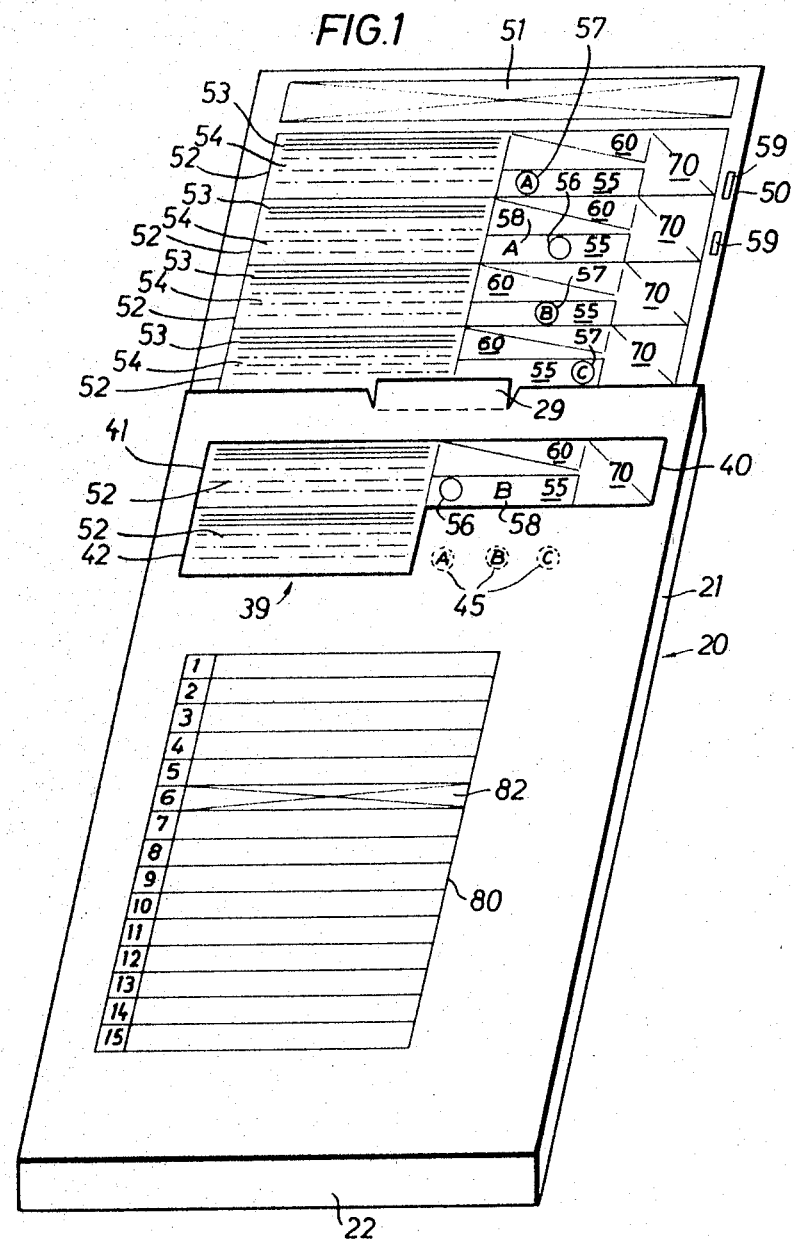

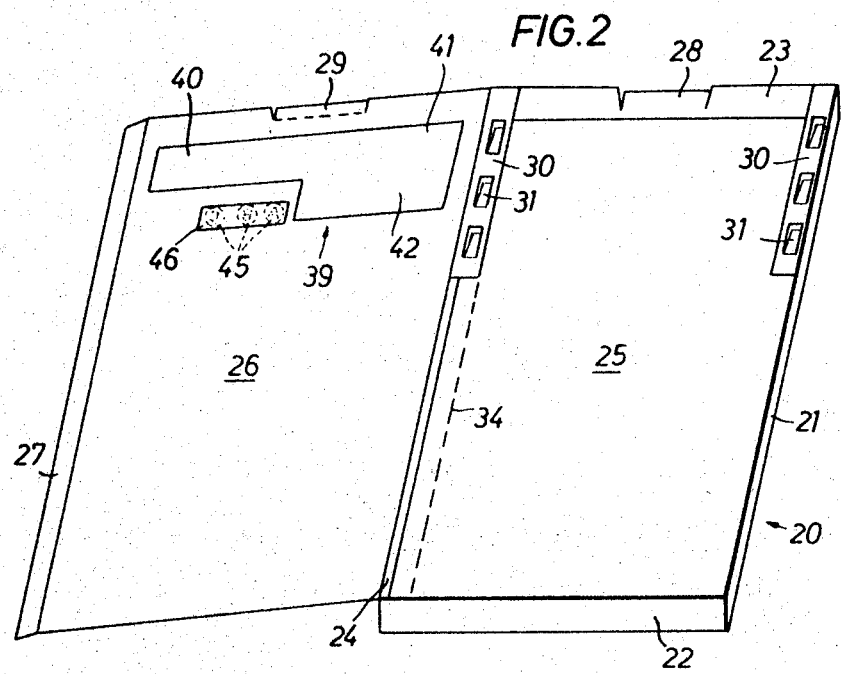
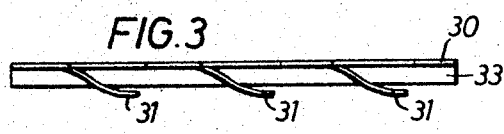
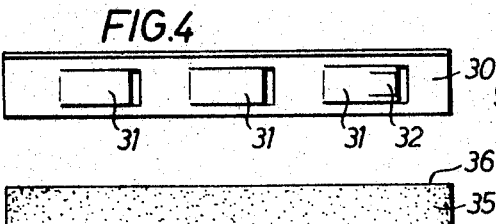
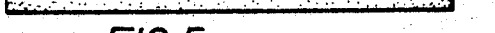
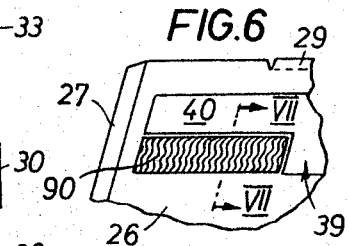
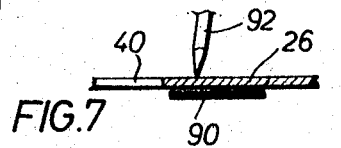
INVENTOR.
HEINZ KUNERT United States Patent Office 3,462,853
Patented Aug. 26, 1969

ABSTRACT OF THE DISCLOSURE

A sleeve has a major surface and a side provided with a slot. At least one program sheet is arranged within the sleeve for withdrawal through the slot in a predetermined direction. The sheet has outlined thereon at least one problem field and at least one reply field which is spaced from the problem field transversely as well as in a direction opposite to said predetermined direction. Window means in the major surface exposes the problem field and is arranged to expose the reply field only in response to movement of the sheet in the predetermined direction. Marking means is provided on the sleeve spaced from the window means and is operative for producing markings on the reply field. Blocking means is provided on the sleeve and is operative for preventing movement of the sheet in a direction opposite the predetermined direction.

BACKGROUND OF THE INVENTION

The present invention relates to an educational device in general, and more particularly to a device for "programmed" education.

Methods of teaching and of testing the knowledge of students have been undergoing radical changes in the last several years. One of these changes is the increasing use of "programmed" education in which knowledge is imparted to the student, or the student is tested for his grasp of the subject matter, by the use of a program which is utilized in conjunction with a suitable device. In programmed teaching, which term is intended to encompass both imparting of knowledge and testing for knowledge, the subject matter to be taught or tested is broken down into many individual steps. Each of these steps is then presented to the student in form of a question, either optically, acoustically or in a combination through audiovisual techniques, accompanied by so-called "multiple-choice" answers. Thus, it is customary to provide three or four plausible-sounding answers of which only one is correct. On selecting the answer which appears to him to be correct, the student manipulates the teaching device which then advances the program, or more particularly the program-carrier, presenting to the student the correct answer. By comparing his choice with the correct answer presented to him, the student learns. If the student is being tested for his knowledge, the teaching device will be so arranged that, when manipulated by the student to indicate his choice among the multiple answers supplied for his selection, a permanent record of his choice will be made for perusal by the person administering the test.

The educational devices of this type which are known to me thus far are all highly complicated, large and expensive. While they may be well suited for institutional use, they cannot find application in the home of the student, for instance to permit him to do his homework in this manner, or for use by students of correspondence schools.

SUMMARY OF THE INVENTION

The present invention provides the above-indicated desirable advantages.

More particularly, the present invention provides an educational device for use in programmed learning and/or which is small and inexpensive.

The educational device, according to the present invention can be freely moved from location to location and is thus suitable for use in the home of the student, or at other places remote from the institution of learning by which the educational program is being administered or supervised.

The educational device according to the present invention further makes it possible to administer tests to a student at any location to which the device can be taken, and entirely without supervision, by recording the student's answers to multiple-choice questions and by preventing subsequent alterations of the answers if the student finds that his choice does not correspond to the correct reply to a question.

Despite the versatility of my novel educational device the latter is so simple in its construction, and therefore so inexpensive, that it is suitable for a single use after which it can be discarded.

In accordance with one feature of my invention my novel educational device comprises a substantially closed sleeve having a major surface and a side provided with a slot. At least one program sheet is arranged within the sleeve and has a leading edge located adjacent to the slot. This sheet is adapted to be withdrawn through the slot in a predetermined direction and has outlined thereon at least one problem field and at least one reply field. The reply field is spaced from the problem field in a direction opposite to the aforementioned predetermined direction, as well as transversely thereof.

In the aforementioned major surface of the sleeve I provide window means which exposes the problem field but is so arranged as to expose the associated reply field only in response to movement of the sheet in the predetermined direction. To record the reply to one of the multiple-choice answers provided in the problem field I provide user-operable marking means on the sleeve. This marking means is so arranged that markings made therewith are produced on the sheet at a location spaced from the window means.

Finally, I provide blocking means which is operative for preventing movement of the sheet in the direction opposite the aforementioned predetermined direction. Thus, after a marking has been made on the sheet to indicate the student's choice of one of the multiple answers, whereupon the sheet is withdrawn through the slot in the predetermined direction and the correct reply is exposed in the reply field, movement of the sheet oppositely the predetermined direction is precluded. This makes it impossible for the student to tamper with his reply once he becomes aware of the correct answer and in the event that his reply was incorrect.

My novel device can advantageously be used in a wide variety of applications, for instance in public schools, in specialized schools, such as driving schools or commercial schools, in the training of personnel in industry and commerce, for correspondence courses, and the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of my novel device;
FIG. 2 is a perspective view of the device shown in FIG. 1, but in opened condition and with the program sheet removed;

FIG. 3 is a detail view of FIG. 2, illustrating on an enlarged scale the blocking means shown in FIG. 2;

FIG. 4 is a top-plan view of FIG. 3;

FIG. 5 is a side-elevational view of a different blocking means;

FIG. 6 is a fragmentary detail view of an embodiment of marking means for use in my novel educational device; and FIG. 7 is a section taken on the line VII—VII of FIG. 6.

DESCRIPTION OF THE PREFERRED EMBODIMENTS

Discussing now the drawing in detail, and firstly FIGS. 1 and 2 thereof, it will be seen that it comprises a receptacle 20. This receptacle may be considered broadly as a sleeve, but will for the sake of expediency hereafter be designated as a "receptacle." I contemplate making it of an inexpensive material, for instance of cardboard and the like so that it can be discarded after one use. The size and configuration of the receptacle 20 can, of course, be varied as desired; advantageously it will be so dimensioned that it can accept sheets whose sizes correspond to applicable industrial norms. Also, the receptacle may be made to accept a single sheet or a plurality of sheets, for instance ten, twenty, fifty or another number.

FIG. 2 in particular shows that the receptacle 20 comprises a bottom wall 25 and a top wall 26. These walls are joined by two lateral side walls 21 and 24 as well as by two transverse side walls 22 and 23 which connect the side walls 21 and 24. The top wall 26 is constructed as a lid as is clearly evident from FIG. 2.

FIG. 1 shows that in the operative condition of the receptacle, when the latter is given to the student with a program sheet inserted as will be discussed below, is completely closed. For this purpose the lid 26 may be provided with a closure strip 27 (compare FIG. 2) which in the closed condition of the lid 26 overlies a surface of the lateral side wall 21, to which it is secured in a suitable manner so that the receptacle cannot be opened without subsequent detection.

It is evident from FIGS. 1 and 2 that in the closed condition of the receptacle the same defines an outlet slot (not identified with a reference numeral) between the lid 26 and the upper edge of the wall 23. It is through this slot that the program sheet 50, which is received in the interior of receptacle 20 and will be described subsequently, is to be withdrawn by the student. To facilitate such withdrawal, both the lid 26 and the wall 23 are provided with two spaced incisions, creating in the wall 23 a movable flap 28 and in the lid 26 a similar flap 29. By moving these flaps aside the user can readily grasp an edge portion of the sheet 50 or, if more than one such sheets are provided, of the uppermost one thereof. It will be evident that the incisions can be spaced farther apart, or closer together than is illustrated in the drawing.

As mentioned earlier, once the sheet 50 is completely or partially withdrawn through the slot provided for this purpose, its reinsertion must be prevented to assure against tampering with previously marked answers. For this purpose, blocking means is provided which, in the illustrated embodiment of FIGS. 1 and 2 takes the form of two longitudinally extending strips 30 of resiliently flexible material, for example synthetic plastic material. One of these strips 30 is carried by the side wall 24 and the other is carried by the side wall 21, as shown in FIG. 2. This figure also shows that each of these strips 30 has cut or stamped therefrom a tongue 31 whose free end faces in the direction of the outlet slot while its connected end faces in the opposite direction. This is illustrated in more detail in FIGS. 3 and 4, where it will be seen that the tongues 31 are bowed downwardly so as to engage resiliently the sheet or sheets 50 received within the receptacle 20. In the illustrated embodiment of FIGS. 1–4 the strips 30 are configured in form of angle profiles whose one leg 33 is secured to the side walls 21 and 24, respectively, whereas the tongues 31 are cut or stamped from the other leg. It will be evident that it is equally possible to secure the strips 30 to the inside of lid 26, if desired, just as it is obvious that, whereas FIG. 2 shows the strips to be provided only in the region of the slot, they can extend over the entire length of the walls 21 and 24, as indicated by the phantom line 34.

FIG. 4 illustrates that, if desired, any one or all of the tongues 31 can themselves be subdivided so as to provide an additional tongue 32 which, because it is shorter than the tongue 31 on which it is provided, will press against the sheet 50 with a force which is greater than that exerted by the associated tongue 31.

It will be obvious that, when the sheet 50 is withdrawn through the outlet slot, the pressure exerted by the tongues 31 on the sheet 50 will be slightly decreased because the tongues have their free ends pointing in the direction of movement of the sheet. If, however, the user should attempt to reinsert the sheet, the friction between the sheet and the tongues would press the same downwardly, that is, away from the lid 26, which would result in such strong engagement with the sheet 50 as to make the insertion of the latter impossible. The force of engagement of the tongues 31 will of course be less if the receptacle is made to accommodate an entire stack of sheets 50, and if most of these sheets have already been withdrawn. Under these circumstances the additional tongues 32 shown in FIG. 2 are particularly advantageous.

To facilitate firmer engagement of the tongues 31 and/or 32 with the sheet 50, and at the same time to facilitate withdrawal of the same in desired increments, the sheet 50 may be provided along both or one of its margins with perforations 59 (compare FIG. 1) into which the tongues 31 and/or 32 engage.

FIG. 5 illustrates another possible embodiment of the blocking means. Here, the strips 30 are replaced with strips 35 of elastically compressible material, for instance, synthetic foam material, felt or the like. These strips 35 can, for instance, be secured with their upper side 36 to the inner side of the lid 26 and, when the latter is closed, are compressed against the sheet or sheets 50. It is advantageous that the material of strips 35 have as high as possible a coefficient of friction with the sheets 50. This does not hinder withdrawal of the sheets 50 through the outlet slot; however, because the material of strips 35 expands whenever a sheet 50 is withdrawn and the compressive stress on the strips 35 is reduced thereby, the insertion of any sheet 50 becomes impossible.

Other embodiment of the blocking means are also possible. It may suffice here to mention one of these, namely the possibility of using resiliently journaled rollers which are free to turn in a sense permitting withdrawal of the sheets 50, but are provided with means preventing them from turning in opposite direction. Such rollers would advantageously consist, or be covered with, a material having a high coefficient of friction with the sheets 50.

Returning to FIGS. 1 and 2, it will be seen that the lid 26 is provided with a window 39 adjacent the outlet slot of the receptacle 20. This window 39 consists of two parts, namely a left-hand part (compare FIG. 1) and a right-hand part. The left-hand part consists of two sections 41 and 42 and the right-hand part consists of a single section 40.

Spaced from the section 40 and transversely aligned with the section 42 the lid 26 is provided with a marking arrangement 45 which, in the illustrated embodiment of FIGS. 1 and 2 consists of the pressure members A, B, C. These members may, for instance, be plastic buttons or knobs the size of a fingertip which are carried on the inside of the lid 26 and on whose inwardly facing ends the letters A, B, C are provided as profiles. Corresponding letters are provided on the outside of the lid 26. The lid further carries on its inside, overlying the buttons, a pigment-carrying web 46 and it will be evident that, when the lid is closed as shown in FIG. 1, and when pressure is exerted on the outside of the lid, for instance on the printed letter A, the profile of the corresponding button will be pressed against the web 46, displacing the same into contact with the sheet 50 and producing the imprint A thereon. It is clear that other letters, numbers or symbols can be used, just as it is clear that they may have a particular shape designed to make it impossible to reproduce the imprint they make.

Again, various modifications are readily possible. For instance, the buttons 45 may consist of, or may have their sheet-contacting end face composed of a material capable of being saturated with a dye for other coloring material. In this case the web 46 will of course not be needed. It is also possible, instead of the previous solutions, to embed at appropriate locations of the sheet or sheets 50, microscopically small plastic bottles which are filled with a coloring agent. This arrangement is known per se and paper prepared in this manner is available commercially under the trade name NCR=No Carbon Required. Evidently, if the sheets 50 are prepared in this manner, the plastic bubbles in the area contacted by the respective button 45 will rupture and yield their coloring agent.

Heretofore I have described the receptacle 20. Turning now to the sheet 50, which is to be used in conjunction with this receptacle and which is illustrated in FIG. 1 in an exemplary embodiment, it will be seen that the sheet is provided with a first field 51 extending across its entire width and being located directly adjacent the leading edge of the sheet 50. Thus, when the sheet 50 is completely received within the receptacle 20, the entire field 51 is visible in the sections 40 and 41 of the window 39. I contemplate using the field 51 to indicate the type of program which is to be found on the sheet 50, suitable instructions and general information. Downwardly of the field 51, that is farther spaced from the leading edge the sheet 50 is provided on its left-hand side with a plurality of problem fields 52 which are arranged in a column. The size of these problem fields 52 is such that two adjacent ones of these appear together in the left-hand part of the window 39, namely in the sections 41 and 42 respectively.

In the embodiment illustrated in FIG. 1 it is assumed that each of the problem fields 52 contains a question 53 (solid lines) which is followed by three multiple-choice questions 54 (dot-dash lines). Each of these questions 54 is preceded by the letter A, B or C. It is evident that the number of questions corresponds to the number of buttons 45, and it is equally evident that if the number of questions is larger or smaller, the number of buttons can be similarly varied.

On the right-hand side of sheet 50 is provided another column of fields, these being reply fields 55 of such a size as to accommodate imprints produced with the buttons 45. Located above each of the reply fields 55, that is closer to the leading edge of the sheet 50, is a field 60 which may contain explanations, additional informations, formulae, instructions and the like, which refer to the question visible to the left. There can be further provided another field 70 which can also contain additional information. The reply fields 55 may have the correct answer suitably indicated, for instance, by a circle surrounding that area in which the correct letter should have been reproduced by exerting pressure on the appropriate button 45.

If desired, the outer side of the lid 26 can have additional information provided thereon. Thus, FIG. 1 shows by way of example a table 80 printed on the lid 26 and sub-divided into 15 sections. It is assumed in this instance that the entire course to be taught consists of 15 parts each of which is to be supplied in a device similar to that illustrated in FIG. 1, and that the part contained in the illustrated device is part No. 6. Also, the lid can carry a space or spaces in which the user can mark his errors.

Operation of my novel device will be obvious from what has been said heretofore. The user is given the device illustrated in FIG. 1 which is completely closed except for the outlet slot. The field 51 is visible in sections 40 and 41 of the window 39 so that the user can determine the contents of the receptacle 20, and can read the instructions provided. In section 2 of the window 39 he can also see the first one of the questions 53 together with the associated multiple-choice questions 52. Having selected one of the choices the user presses one of the buttons 45, namely that one whose letter corresponds to the letter which identifies the selected question 52. This produces in the associated field 55, which at that time is not visible in section 40 because it is longitudinally offset from the associated field 42 an imprint registering his reply. Thereupon he grasps the sheet 50 as previously outlined and withdraws it through the outlet slot until the just-answered question 53 and its associated multiple-choice questions 52 move from section 42 to section 41 whereas a new question appears in section 42. Simultaneously, the reply field associated with the just-answered question 53, which is now located in section 41, becomes visible in section 40 so that the user can immediately determine whether his reply has been correct. In the illustrated embodiment the reply is correct if an imprint has been produced within the circle provided in the reply field 55 and it will be seen, as indicated at 57, that the user has replied to some of the questions correctly, while he has replied incorrectly to others. This immediate determination of the correctness or incorrectness of his answers has been found to strongly facilitate learning. This is enhanced by the additional information which may be contained in the fields 60 and 70 and which may consist of explanations, rules, exceptions to the rules, instructions, etc.

The provision of the blocking means prevents the user from reinserting the sheet 50 if he should find that his answers are not correct. Thus, it is made impossible for him to "cheat." An additional safeguard against this can be provided by making the letters or other symbols which are produced by the buttons 45 of suitably complicated configuration, as pointed out before, to prevent subsequent imitation by hand. Also, the colors used for the imprints may be unusual.

Coming now to the embodiment illustrated in FIGS. 6 and 7, it will be seen that this illustrates yet a further arrangement of the marking means. In this embodiment the buttons 45 are eliminated and are replaced by a pigmented web—such as carbon paper or the like—which is identified with reference numeral 90 and is provided on the inside of the lid 26 in the same area in which in FIG. 1 the buttons 45 are located. It is then possible to make the necessary marking by producing pressure on the outside of the lid 26, for instance with a pencil 92 or the like. Because the markings for all problems must be produced on the same area of the outside of lid 26, it is necessary that pencil marks be removable. For this purpose the lid 26 may consist wholly or in part of synthetic plastic material from which pencil marks can be wiped off. FIG. 6 illustrates that it is possible to guard against cheating by using a specially prepared web 90 on which pigmented sections alternate with non-pigmented sections in a predetermined pattern of lines, dots, or the like, so that markings produced have a characteristic pattern which cannot later be reproduced freehand by the use of ordinary carbon paper.

It will be understood that the present invention admits of a variety of modifications without departing from the concept of the invention. Thus, the free edges of the tongues 31 and/or 32 may be provided with a thickened portion to further prevent reinsertion of the sheet 50. Also, the tongues 31 on one of the strips 30 can be longitudinally offset with respect to the tongues of the other of the strips 30. This reduces by one half the distance to which the sheet 50 can be reinserted before it encounters resistance. Additional information for the user can be provided on the reverse side of the sheets 50. Thus, the reverse side of each sheet can carry an outline of the material which is to be covered in the next following sheet.

It will be understood that each of the elements described above, or two or more together, may also find a useful application in other types of devices differing from the types described above.

While the invention has been illustrated and described as embodied in an educational device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following.

I claim:

1. A device of the character described comprising, in combination, a substantially closed sleeve having a major surface and a side provided with a slot; at least one program sheet arranged within said sleeve and having a leading edge adjacent said slot, said sheet being adapted to be withdrawn through said slot in a predetermined direction and having outlined thereon at least one problem field and at least one reply field spaced from said problem field transversely as well as in a direction opposite to said predetermined direction; window means provided in said major surface of said sleeve and exposing said problem field, said window means being arranged to expose said reply field only in response to movement of said sheet in said predetermined direction; user-operable marking means provided on said sleeve spaced from said window means and being operative for producing markings on said reply field which constitute user responses to problems perceived in said problem field; and blocking means operative for preventing movement of said sheet in the direction opposite said predetermined direction whereby, after a marking has been made on said sheet, and thereafter said sheet is withdrawn through said slot in said predetermined direction to thereby expose said reply field associated with said problem field, movement of said sheet oppositely said predetermined direction is precluded.

2. A device as defined in claim 1, wherein said program sheet has outlined therein at least one additional problem field adjoining said one problem field in the direction opposite said predetermined direction, and at least one additional reply field associated with said additional problem field and adjoining said one reply field in said direction opposite said predetermined direction, said window means comprising a first portion having an area corresponding to the combined areas of both of said problem fields to thereby expose the same, and a second portion having an area corresponding to that of one of said reply fields.

3. A device as defined in claim 2, wherein said first portion of said window means includes two halves each having an area corresponding to one of said problem fields, one of said halves being closer to said leading edge than the other half, and wherein said second portion is transversely aligned with said one half of said first portion.

4. A device as defined in claim 3, wherein said sleeve is elongated and comprises two longitudinal sides and two transverse sides, said slot being provided at one of said transverse sides.

5. A device as defined in claim 4, and further comprising a cut-out provided in said sleeve in the region of said one transverse side for facilitating gripping of said sheet by the fingers of a user for subsequent movement of the sheet in said predetermined direction.

6. A device as defined in claim 4, wherein each of said problem fields carries indicia representing a predetermined number of situations, each identified with a different symbol, and wherein said marking means comprises means for individually reproducing each of said symbols on said sheet.

7. A device as defined in claim 6, wherein said marking means comprises a plurality of pushbuttons corresponding to said predetermined number of situations, and wherein each of said pushbuttons comprises a symbol-producing face carrying one of said symbols thereon.

8. A device as defined in claim 7; and further comprising impression-transferring means arranged for transferring an impression received from one of said faces onto said sheet.

9. A device as defined in claim 8, wherein said impression-transferring means comprises a pigmented transfer web analogous to carbon paper.

10. A device as defined in claim 9, wherein said transfer web is arranged within said sleeve and connected thereto so as to remain stationary despite movement of said sheet in said predetermined direction.

11. A device as defined in claim 9, wherein said sleeve comprises a wall provided with said major surface, said wall being provided with a plurality of openings communicating with the interior of said sleeve and each accommodating a portion of one of said pushbuttons, and wherein such transfer web is arranged within said sleeve and overlies said openings so as to be placed into pigment-transferring engagement with said sheet in response to depression of one of said pushbuttons.

12. A device as defined in claim 7, wherein said sleeve comprises a wall provided with said major surface, said pushbuttons being carried by said wall interiorly of said sleeve and being adapted to be placed into engagement with said sheet in response to exertion of pressure on said major surface in the region of the respective pushbuttons.

13. A device as defined in claim 12, wherein each of said pushbuttons has a face provided with one of said symbols and adapted to be placed into engagement with said sheet, each face carrying a supply of pigment transferable to said sheet in response to pressure-engagement with the latter.

14. A device as defined in claim 12, wherein portions of said sheet which are adapted to be engaged by said pushbuttons carry miniature pigment-containing capsules rupturable in response to exertion of pressure resulting from engagement by one of said pushbuttons.

15. A device as defined in claim 1, wherein said sleeve has two spaced major walls extending in planes parallel with said sheet, said sheet being located between said walls; and wherein said blocking means comprises at least two resiliently flexible tongues provided on said sleeve extending across the interior thereof in direction from one toward the other of said walls and pressing against said sheet.

16. A device as defined in claim 15, wherein said sleeve further comprises two side walls connecting said major walls and extending at a right angle relative thereto, said blocking means further comprising two strips carried by the respective side walls extending normal to the elongation of said slot, and said tongues being stamped from a respective one of said strips.

17. A device as defined in claim 16, wherein said tongues are elongated in the direction of elongation of said strips, each of said tongues having a connected end connected to the respective strip and a free end facing said slot.

18. A device as defined in claim 16, wherein said tongues each comprise a main body portion, and an auxiliary body portion stamped from said main body portion and constituting an auxiliary tongue having a connected end connected with said main body portion and a free end facing said slot, said auxiliary body portions having greater resiliency than said main body portions.

19. A device as defined in claim 16, wherein said sheet is provided in transversely spaced marginal portions thereof which extend normal to said leading edge with a plurality of perforations arranged in said predetermined direction and each adapted to receive one of said tongues.

20. A device as defined in claim 1, wherein said sleeve has two spaced major walls extending in planes parallel with said sheet on opposite side thereof and a pair of side walls connecting said major walls; and wherein said blocking means comprises two strips of elastically compressible material extending along the respective side walls and adapted to engage marginal portions of said sheet with a high coefficient of friction.

21. A device as defined in claim 1, wherein said sleeve has two spaced major walls extending in planes parallel with said sheet on opposite side thereof, and a pair of side walls connecting said major walls; and wherein said blocking means comprises at least two rollers provided in the region of the respective side walls within said sleeve, said rollers each having a circumferential surface adapted to engage said sheet with a high coefficient of friction and being constructed and arranged for turning only in a sense enabling withdrawal of said sheet in said predetermined direction.

22. A device as defined in claim 1, wherein said sleeve consists at least in part of cardboard.

23. A device as defined in claim 1, wherein said marking means comprises a web arranged within said sleeve carried thereby and having an impression-transferring face juxtaposed with said sheet whereby markings may be transferred to said sheet in response to scribing of indicia by exertion of pressure on said major surface of said sleeve.

24. A device as defined in claim 23, wherein said impression-transferring face comprises a pattern of non-transferring face portions whereby, when indicia are made on said major surface of said sleeve under exertion of pressure on the latter, corresponding impressions transferred to said sheet will be disrupted in accordance with said pattern.

References Cited

UNITED STATES PATENTS

| | | | |
|---|---|---|---|
| 3,046,675 | 7/1962 | Schure | 35—9 |
| 3,105,307 | 10/1963 | Cornell | 35—9 |
| 3,152,403 | 10/1964 | Betz | 35—9 |

EUGENE R. CAPOZIO, Primary Examiner

W. H. GRIEB, Assistant Examiner